United States Patent
Yang et al.

(10) Patent No.: US 7,116,090 B1
(45) Date of Patent: Oct. 3, 2006

(54) SWITCHING CONTROL CIRCUIT FOR DISCONTINUOUS MODE PFC CONVERTERS

(75) Inventors: Ta-yung Yang, Milpitas, CA (US); Tso Min Chen, Taichung (TW); Pei-Sheng Tsu, Shulin (TW); Ying Chieh Su, Sijhih (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/255,709

(22) Filed: Oct. 19, 2005

(51) Int. Cl.
*G05F 1/40* (2006.01)
*G05F 1/10* (2006.01)

(52) U.S. Cl. ............... 323/288; 323/284; 323/285
(58) Field of Classification Search ......... 323/222, 323/282, 283, 284, 285, 288, 290
See application file for complete search history.

(56) References Cited

U.S. PATENT DOCUMENTS 5,548,206 A * 8/1996 Soo ..................... 323/284
6,518,738 B1 * 2/2003 Wang ................... 323/284
2006/0043943 A1 * 3/2006 Huang et al. ........... 323/222

\* cited by examiner

*Primary Examiner*—Jessica Han
(74) *Attorney, Agent, or Firm*—J.C. Patents

(57) ABSTRACT

A switching control circuit having detection terminal, input terminal, ramp generator, program terminal, error amplifier, mix circuit, and delay circuit for power factor control is provided. The detection terminal generates a detection signal in response to the inductor discharge. An input terminal is connected for detecting a switching current signal. The program terminal determines the slew rate of the ramp signal and the maximum on-time of the switching signal. An error amplifier generates an error signal for regulating the output. A mix circuit generates a mixing signal proportional to ramp signal and the switching current signal. The switching signal is turned on in response to the detection signal, and is turned off based on the error signal. The slew rate of the mixing signal is increased in response to the increase of the input voltage. The on-time of the switching signal is increased inversely proportional to the input voltage.

12 Claims, 10 Drawing Sheets

US 7,116,090 B1

SWITCHING CONTROL CIRCUIT FOR DISCONTINUOUS MODE PFC CONVERTERS

FIELD OF INVENTION

The present invention is related to power factor control (PFC), and more particularly to a control circuit for power factor control in discontinuous mode.

BACKGROUND OF THE INVENTION

Most power factor correction techniques incorporate a boost topology, which is operated in either continuous or discontinuous inductor current mode and is operated at a fixed or variable switching frequency. Due to a lower peak current, the continuous inductor current mode, which operated at a fixed switching frequency, is used for higher power applications. For lower power applications, the discontinuous inductor current mode, which is operated in a variable switching frequency, provides several advantages including smaller inductor size, lower costs, simpler circuitry, and zero current switching (ZCS).

FIG. 1 illustrates a conventional PFC converter, in which a switching signal $V_G$ is connected to a transistor 10 to switch an inductor 20 and to control an input current $I_{IN}$. An input current $I_{AC}$ of the PFC converter is controlled to achieve a lower current harmonic distortion.

FIGS. 2A and 2B illustrate the input current waveforms $I_{AC}$ and $I_{IN}$ in response to the input voltages $V_{AC}$ and $V_{IN}$ for the conventional PFC converter. The pulse width of the PFC controller is controlled by a voltage error amplifier, which is compared to a saw-tooth waveform generated by a control circuit. The pulse width varies with the line and load conditions but should be maintained at a constant for a half line cycle. Therefore the voltage error amplifier is necessary to have a lower frequency bandwidth that is below the line frequency. The ZCS includes several application advantages. For example, the inductor current is released to zero before the next switching cycle is started thus producing higher switching efficiency. Because the change of the inductor current is equal to the peak inductor current and the current starts and returns to zero on each cycle, the current waveform has a triangular shape with an average value equal to one-half of the peak current multiplied by its time. Since ZCS is switched right on edge between continuous and discontinuous current modes; therefore, variable switching frequency is resulted. The low-bandwidth pulse width modulation (PWM) incorporating ZCS provides a natural power factor correction for an input current.

FIG. 3 illustrates the input current ($I_{IN}$) waveform, which is increased in response to the enabling of the switching signal ($V_G$), for the conventional PFC converter. The on-time ($T_{ON}$) and the off-time ($T_{OFF}$) represent a charge period and a discharge period of the inductor 20, respectively.

FIGS. 4A, 4B, and 4C illustrate the three control stages T1–T3 of the conventional PFC converter. The inductor 20 is charged when the transistor 10 is turned on. The energy of the inductor 20 is discharged to the capacitor 50 through a rectifier 30 once the transistor 10 is turned off. The output voltage (VO) of the PFC converter is normally set to a higher voltage, such as 400V, to achieve a better power factor control. Therefore, a parasitic capacitor 15 of the transistor 10 shall be charged up to the higher voltage VO during the discharge period of the inductor 20. As illustrated in FIG. 4C, the energy stored in the parasitic capacitor 15 shall be discharged to the capacitor 16 (or a parasitic capacitor) after the inductor 20 is fully discharged and before the transistor 10 is turned on. A voltage $V_{OS}$ is thus produced on the capacitor 16. The voltage $V_{OS}$ therefore inhibits the input current $I_{AC}$ which flows through the bridge rectifier 40 during the lower $V_{AC}$ period.

FIGS. 5A and 5B illustrate the input current distortion that is caused by the voltage $V_{OS}$. Recently a variety of discontinuous current PFC controllers have been developed for the power factor control, such as ST6561 of ST-Microelectronics, France; and TDA4862 of Siemens, Germany.

FIG. 6A illustrates the circuit schematic of the aforementioned conventional PFC controllers, in which a multiplier terminal (VM) is connected to sense the input waveform $V_{IN}$ via a plurality of resistors 21 and 22. The voltage sensed on the multiplier terminal (VM) is applied to modulate the on-time ($T_{ON}$) as illustrated in FIG. 6B. The modulated on-time ($T_{ON}$) shall reduce the voltage $V_{OS}$ and improve the input current waveform. However, the drawbacks of the foregoing approach are a higher power consumption of the resistor 21 and complexity of the control circuitry. In addition, another drawback of the aforementioned controllers is without under-voltage protection, which causes the PFC converter to overload in case of brownout conditions.

SUMMARY OF THE INVENTION

The object of the invention is to provide a switching control circuit for a PFC converter in discontinuous mode for reducing the current harmonic distortion without the need of the input voltage detection and a multiplier. Another object of the invention is to provide a method for limiting the maximum output power of the PFC for under-voltage protection. In addition, a delay circuit limiting the maximum switching frequency of the switching signal, which reduces the power consumption of the PFC converter in light load operations, is provided.

The switching control circuit includes a detection terminal which is coupled to the inductor to generate a detection signal in response to the discharge of the inductor. An input terminal is connected to detect a switching current signal in accordance with the switching current of the inductor. A ramp generator is equipped for producing a ramp signal in response to the turning on of the switching signal. A program terminal is coupled to the ramp generator to determine the slew rate of the ramp signal and to determine the maximum on-time of the switching signal. An error amplifier is coupled to the output of the PFC converter for generating an error signal for regulating the output of the PFC converter. A mix circuit is used for generating a mixing signal which is proportional to the ramp signal and the switching current signal. Therefore, the switching signal is turned on in response to the detection signal, and is turned off once the mixing signal is higher than the error signal. The slew rate of the mixing signal is increased in response to the increase of the input voltage $V_{IN}$. The on-time of the switching signal ($V_G$) is thus increased proportionally to the decrease of the input voltage ($V_{IN}$). Therefore, the input current harmonic is reduced.

Furthermore, the switching control circuit includes a delay circuit for generating an inhibit signal in response to the turning off of the switching signal. The inhibit signal includes a delay time for postponing the turning on of the switching signal and limits the maximum switching frequency of the switching signal. The delay time is increased in response to the decrease of the error signal. The error signal is decreased proportionally with the load. Therefore, the power consumption of the PFC converter is reduced in light load operations.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
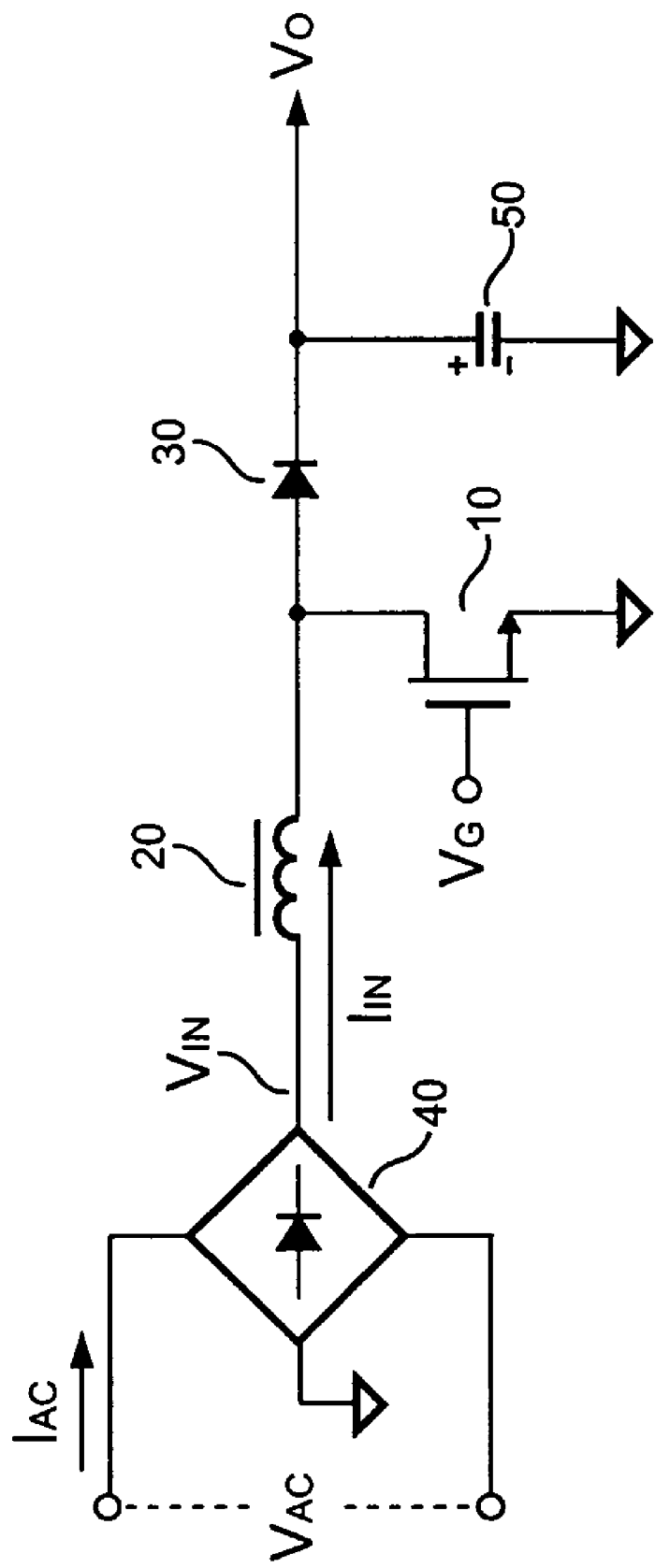
FIG. 1 is a schematic diagram of a conventional PFC converter.
Figure 2A:
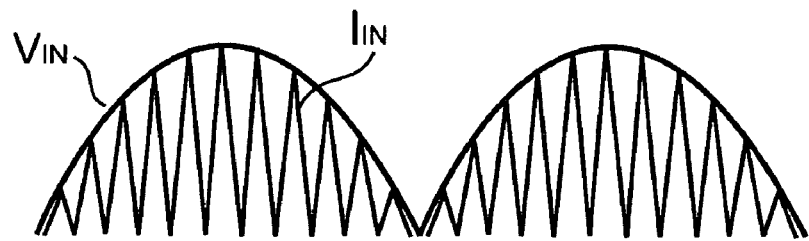
FIGS. 2A and 2B illustrate the input current waveforms in response to an input voltage for the conventional PFC converter.
Figure 2B:
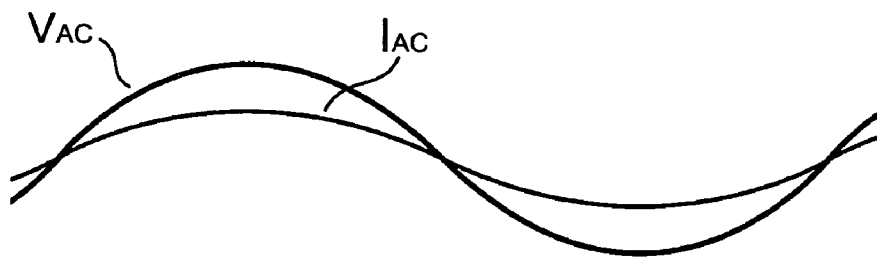
Figure 3:
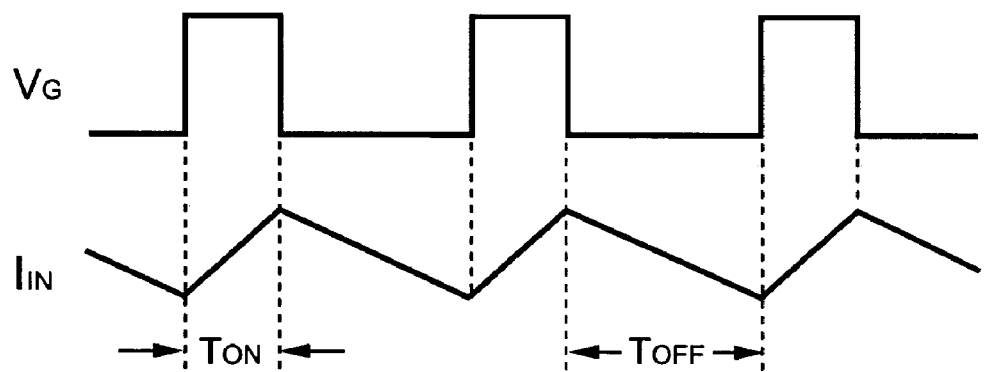
FIG. 3 illustrates the input current waveform in response to a switching signal.
Figure 4A:
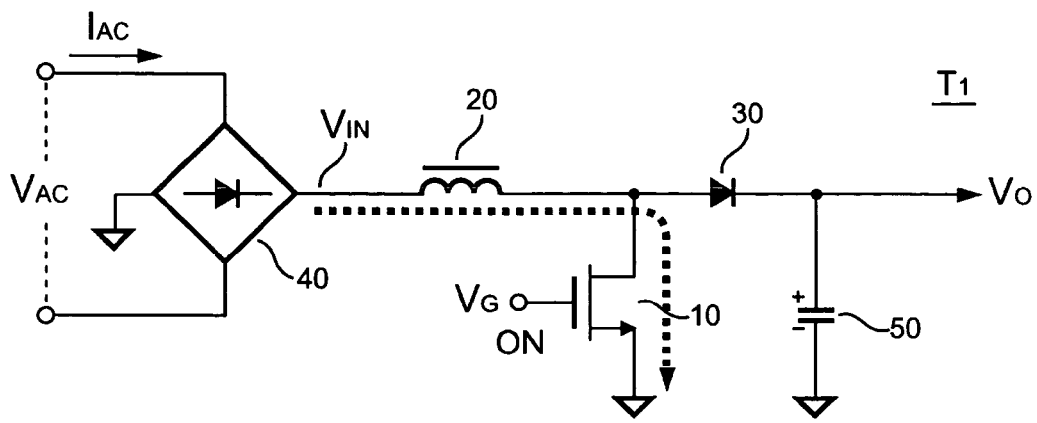
FIGS. 4A, 4B, and 4C illustrate the three control stages of the PFC converter.
Figure 4B:
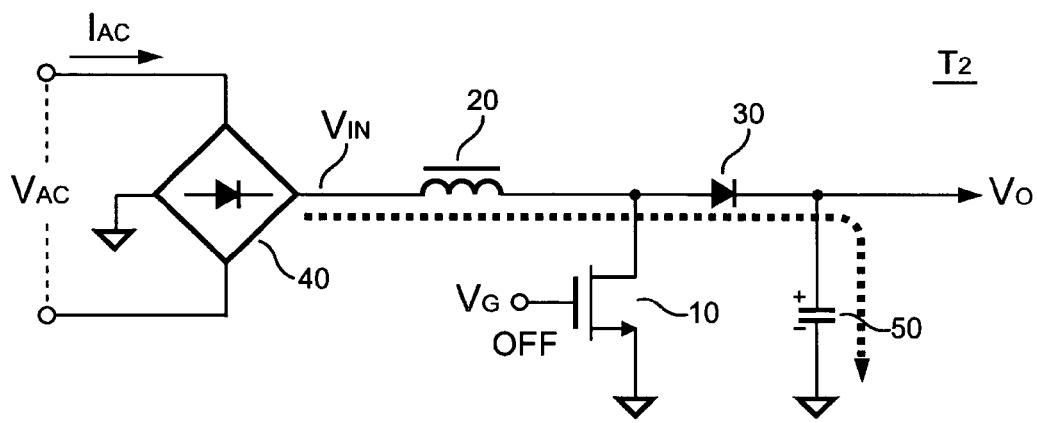
Figure 4C:
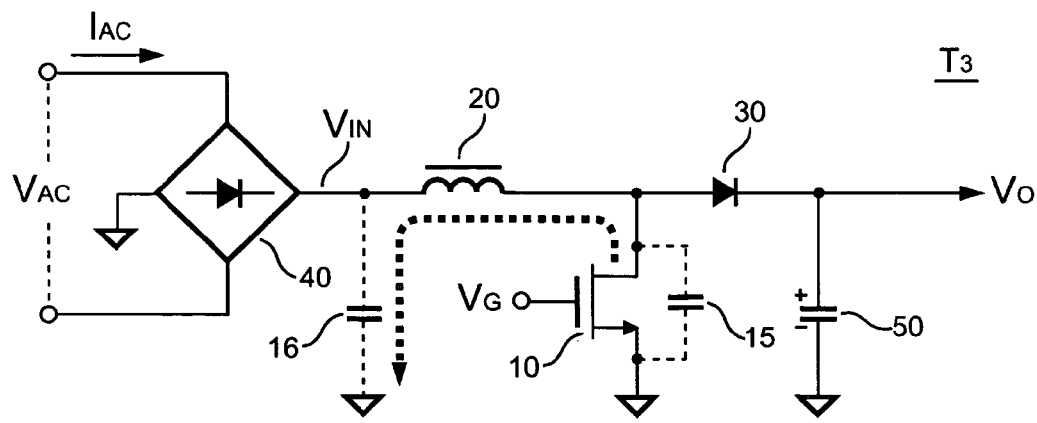
Figure 5A:
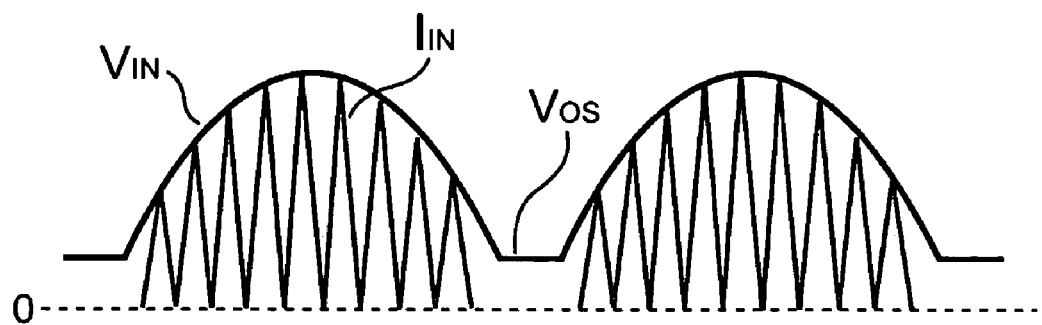
FIGS. 5A and 5B illustrate a waveform distortion of the input current for the conventional PFC converter.
Figure 5B:
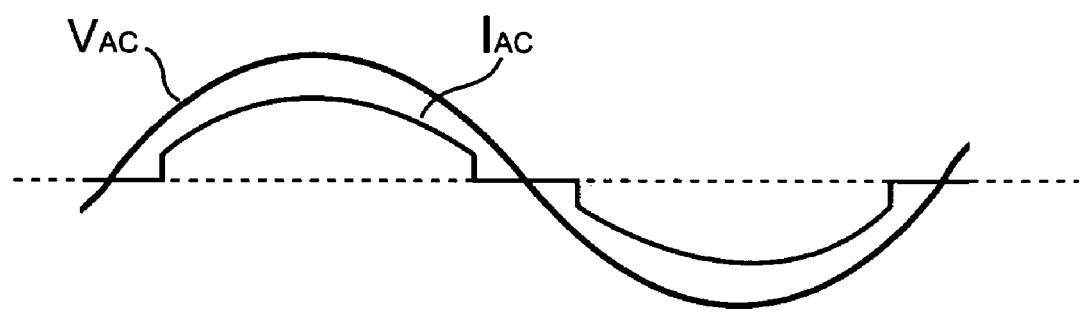
Figure 6A:
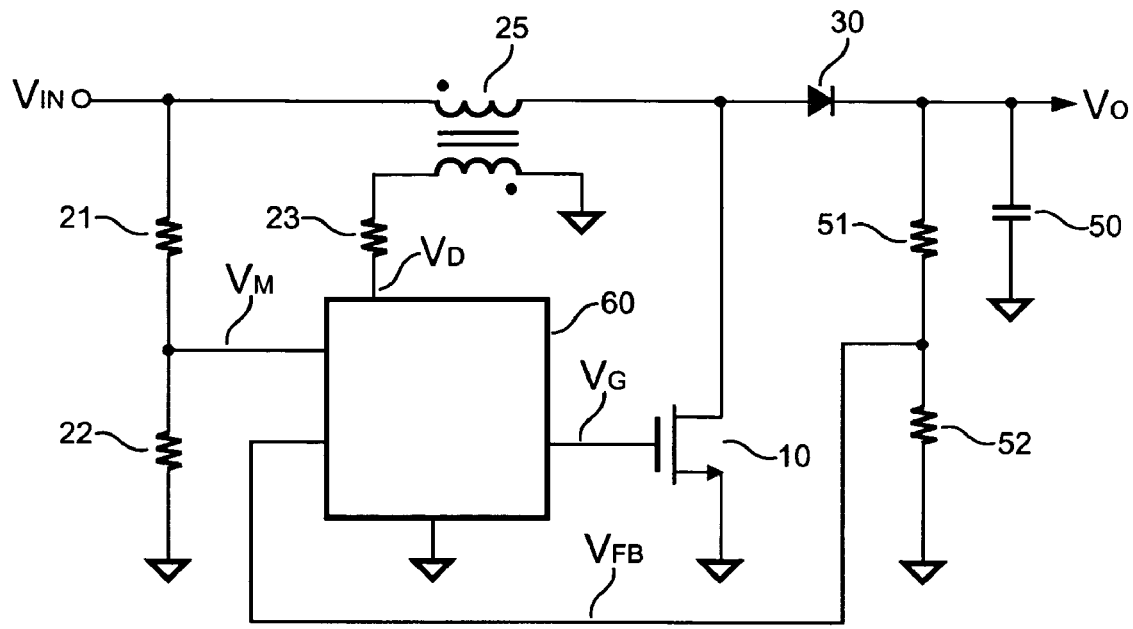
FIG. 6A is a circuit schematic of a conventional PFC converter, in which the controller of the PFC converter includes a multiplier for improving the harmonic distortion of the input current.
Figure 6B:
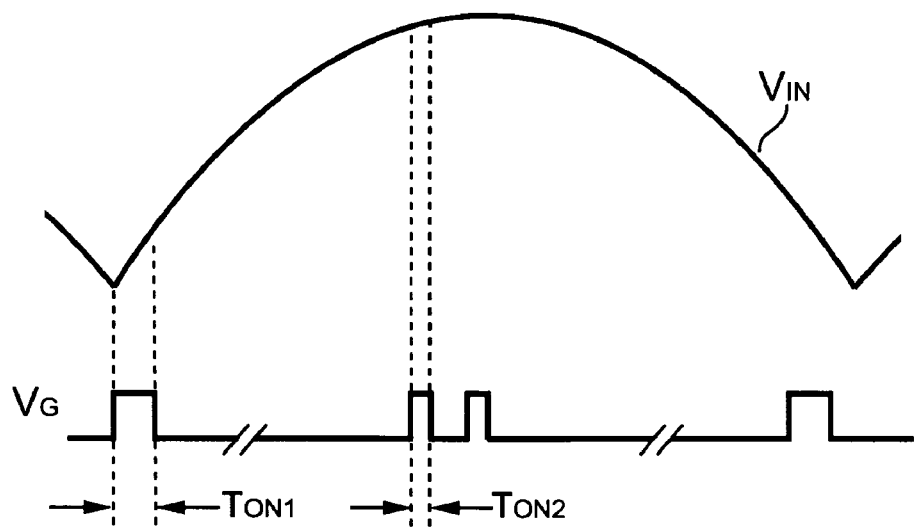
FIG. 6B illustrates the conventional modulated on-time that is controlled by the multiplier.
Figure 7:
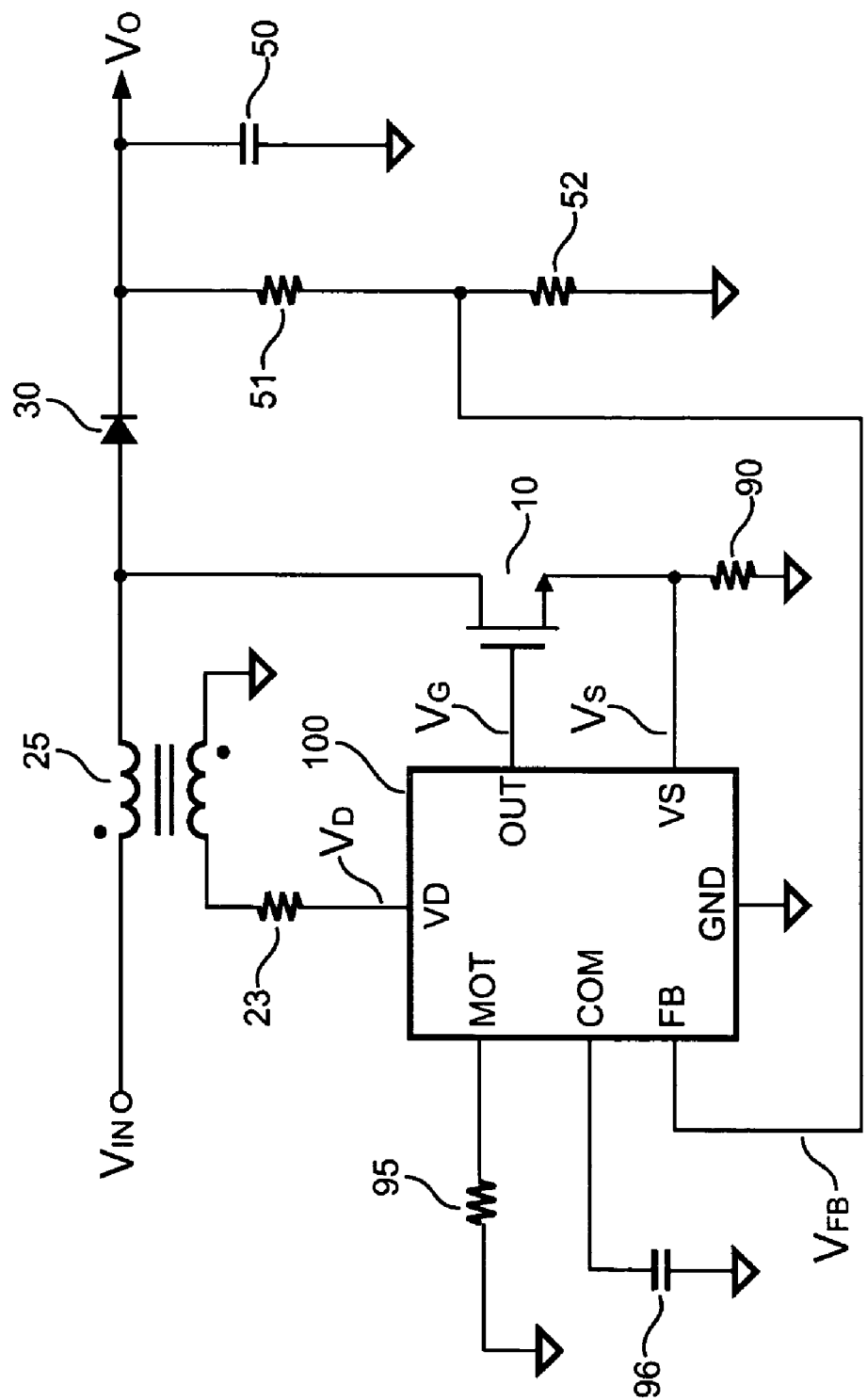
FIG. 7 is a schematic diagram of a PFC converter in accordance with an embodiment of the present invention.

FIG. 7 is a schematic diagram of a PFC converter in discontinuous mode in accordance with an embodiment of the present invention. Using the PFC converter, an AC line input is converted to a DC output Vo, in which a transistor 10 controls the energy by switching an input voltage ($V_{IN}$) via an inductor 25, a rectifier 30, and a capacitor 50. The purpose of the PFC is to control the current waveform of the AC line input as a sinusoidal waveform and to maintain the phase of the current to be the same as that of the line input voltage $V_{AC}$. Through the rectification of the bridge, the $V_{IN}$ is always positive with respect to the ground of the PFC converter.

$$V_{IN}(t) = Vp \sin(\omega t),$$

where $Vp = \sqrt{2} \times V_{IN}$ (rms) and t=time;

The input current is similarly expressed as the following:

$$I_{IN}(t) = Ip \sin(\omega t),$$

where $Ip = \sqrt{2} \times I_{IN}$ (rms);

The input power of the PFC converter is then given by the following:

$$Pin = Vp \times Ip/2.$$

Taking the efficiency ($\eta$) into consideration in the equation, the output power is then given by the following:

$$Po = Vp \times Ip \times \eta/2 \qquad (1)$$

Equation 1 is expressed with respect to the input current as the following:

$$Ip = (2 \times Po)/(Vp \times \eta) \qquad (2)$$

Due to the ZCS, a peak inductor current (IL-p) of the inductor 25 is twice that of an average inductor current, which is described as the following:

$$IL\text{-}p = 2 \times Ip$$

$$IL\text{-}p = (4 \times Po)/(Vp \times \eta) \qquad (3)$$

The inductor current is shown in its time variant form below:

$$IL(t) = (4 \times Po) \sin(\omega t)/(Vp \times \eta) \qquad (4)$$

The inductor current is solved for the on-time required to charge the inductor L to a peak current such as I=L (di/dt).

$$T_{ON} = IL\text{-}p \times L/Vp \qquad (5)$$

$$T_{ON} = (4 \times Po \times L)/(Vp^2 \times \eta) \qquad (6)$$

$$T_{OFF} = (IL\text{-}p \times L)/(Vo - Vp)$$

$$T_{OFF} = (4 \times Po \times L)/[(\eta \times Vp) \times (Vo - Vp)] \qquad (7)$$

$$T = T_{ON} + T_{OFF} \qquad (8)$$

Equation 5 is also expressed with respect to the output power Po.

$$Po = [Vp^2 \times \eta/(4 \times L)] \times T(on) \qquad (9)$$

According to Equation 9, the output power is controlled by the on-time $T_{ON}$. Limiting the maximum on-time limits the maximum output power especially for under voltage protection such as brownout protection.

When the AC power is applied to the PFC converter, a DC voltage shall be produced on the output Vo via the inductor 25, the rectifier 30, and the capacitor 50. A switching control circuit 100 is coupled to the output of the PFC converter through the resistors 51 and 52. The capacitor 96 is connected to a COM terminal of the switching control circuit 100 to provide the frequency compensation for a lower frequency bandwidth that is below the line frequency. The switching signal $V_G$ is outputted by the switching control circuit 100 to drive the transistor 10. When the transistor 10 is driven to be turned on by the switching signal ($V_G$), the inductor 25 is charged via the transistor 10. A resistor 90 generates a switching current signal in accordance with the inductor current. The switching current signal is then connected to a VS terminal of the switching control circuit 100. The switching signal ($V_G$) is switched off as long as the switching current signal is higher than the threshold voltage $V_{R2}$, which achieves a cycle-by-cycle current limit for the switching. While the transistor 10 is switched off by the switching signal $V_G$, the energy stored in the inductor 25 is released to the output Vo via the rectifier 30. As soon as the discharge current of the inductor 25 drops to zero, a zero voltage shall be detected in the auxiliary winding of the inductor 25. A detection terminal VD of the switching control circuit 100 used for detecting the zero current state is connected to the auxiliary winding through a resistor 23. A detection signal is generated after the zero current state is detected, and the switching control circuit 100 is thus able to start the next switching cycle.

Figure 8:
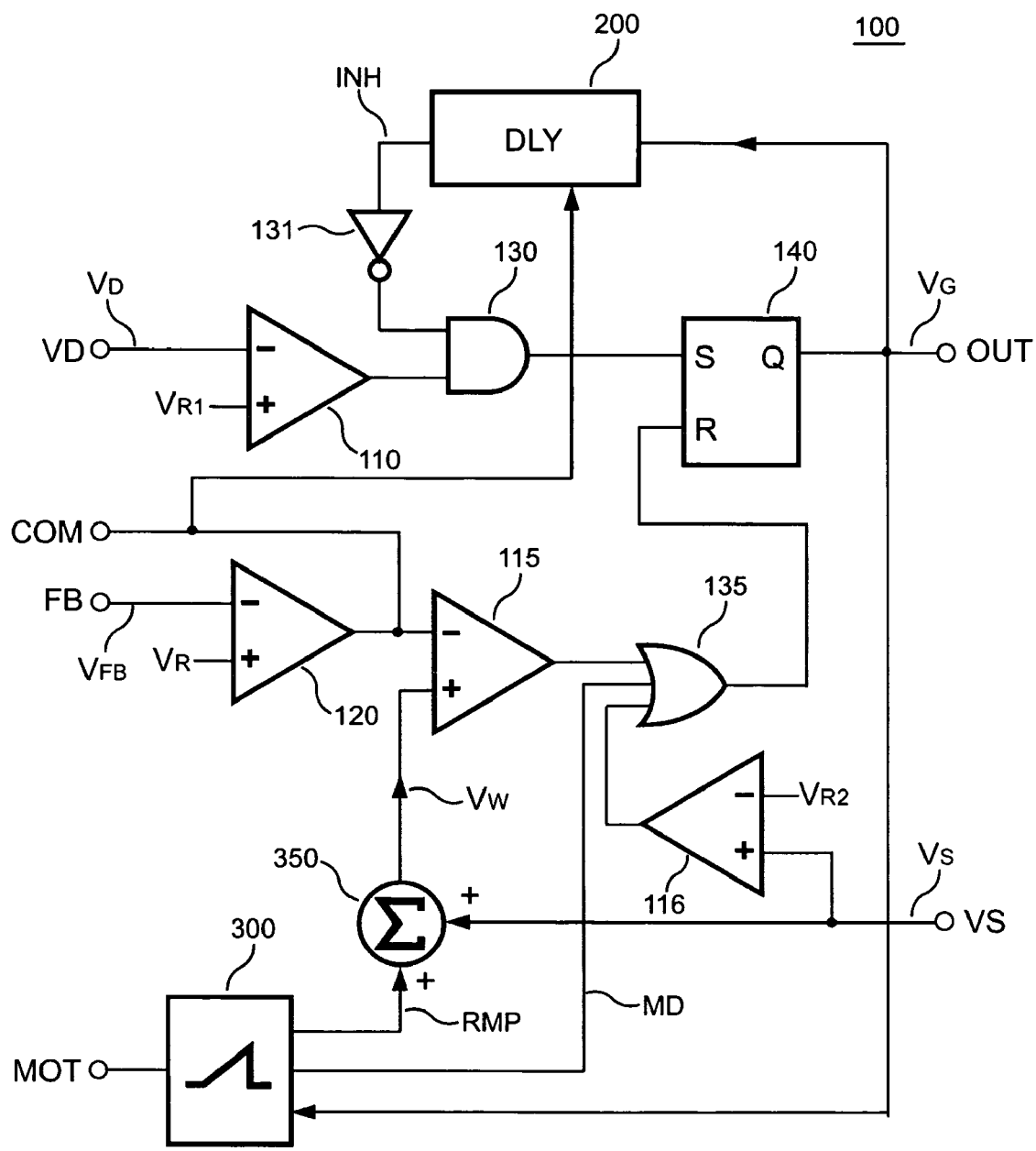
FIG. 8 is a schematic diagram of a switching control circuit in accordance with an embodiment of the present invention.

FIG. 8 illustrates a schematic diagram of the switching control circuit 100 in accordance with an embodiment of the present invention. A ramp generator 300 produces a ramp signal (RMP) and a maximum-duty signal (MD) in response to the switching signal ($V_G$). A MOT terminal is coupled to the ramp generator 300 to determine the slew rate of the ramp signal (RMP) and the maximum on-time of the switching signal ($V_G$). FIG. 7 illustrates a resistor 95 connected from the MOT terminal of the switching control circuit 100 to the ground determines the maximum on-time of the switching signal ($V_G$). The maximum on-time of the switching signal ($V_G$) further limits the minimum switching frequency of the switching signal ($V_G$), which prevents the switching frequency to drop down into the audio band. An error amplifier 120 is coupled to the output of the PFC converter to generate an error signal at the output of the error amplifier 120 for regulating the output of the PFC converter. The error amplifier 120 is a trans-conductance error amplifier. The output of the error amplifier 120 is further connected to the COM terminal of the switching control circuit 100 and to an input to a delay circuit 200. A mix circuit 350 generates a mixing signal ($V_W$) proportional to the ramp signal (RMP) and the switching current signal. A comparator 115 having a negative input and a positive input is connected to the output of the error amplifier 120 and the mixing signal ($V_W$) respectively. The output of the comparator 115 generates a first reset signal connected to the input of an OR gate 135. A comparator 116 generates a second reset signal connected to another input of the OR gate 135. The third input of the OR gate 135 is connected to the maximum-duty signal (MD). The threshold voltage ($V_{R2}$) and the switching current signal are connected to the inputs of the comparator 116 for achieving the cycle-by-cycle current limit. The output of the OR gate 135 is connected for resetting a flip—flip 140. The flip—flip 140 is utilized to generate the switching signal ($V_G$). A comparator 110 is coupled to the detection terminal (VD) and a threshold voltage ($V_{R1}$). The detection signal is thus generated once the voltage of the detection terminal (VD) is lower than the threshold voltage ($V_{R1}$). The detection signal is coupled to enable the flip-flop 140 via an AND gate 130. Therefore, the switching signal ($V_G$) is turned on in response to the detection signal, and is turned off once the mixing signal ($V_W$) is higher than the error signal. Furthermore, the delay circuit 200 is used for generating an inhibit signal (INH) in response to the turning off of the switching signal ($V_G$). Through an inverter 131, the inhibit signal (INH) is connected to another input of the AND gate 130. The inhibit signal (INH) includes a delay time for postponing the turning on of the switching signal ($V_G$) and limits the maximum switching frequency of the switching signal ($V_G$).

Figure 9:
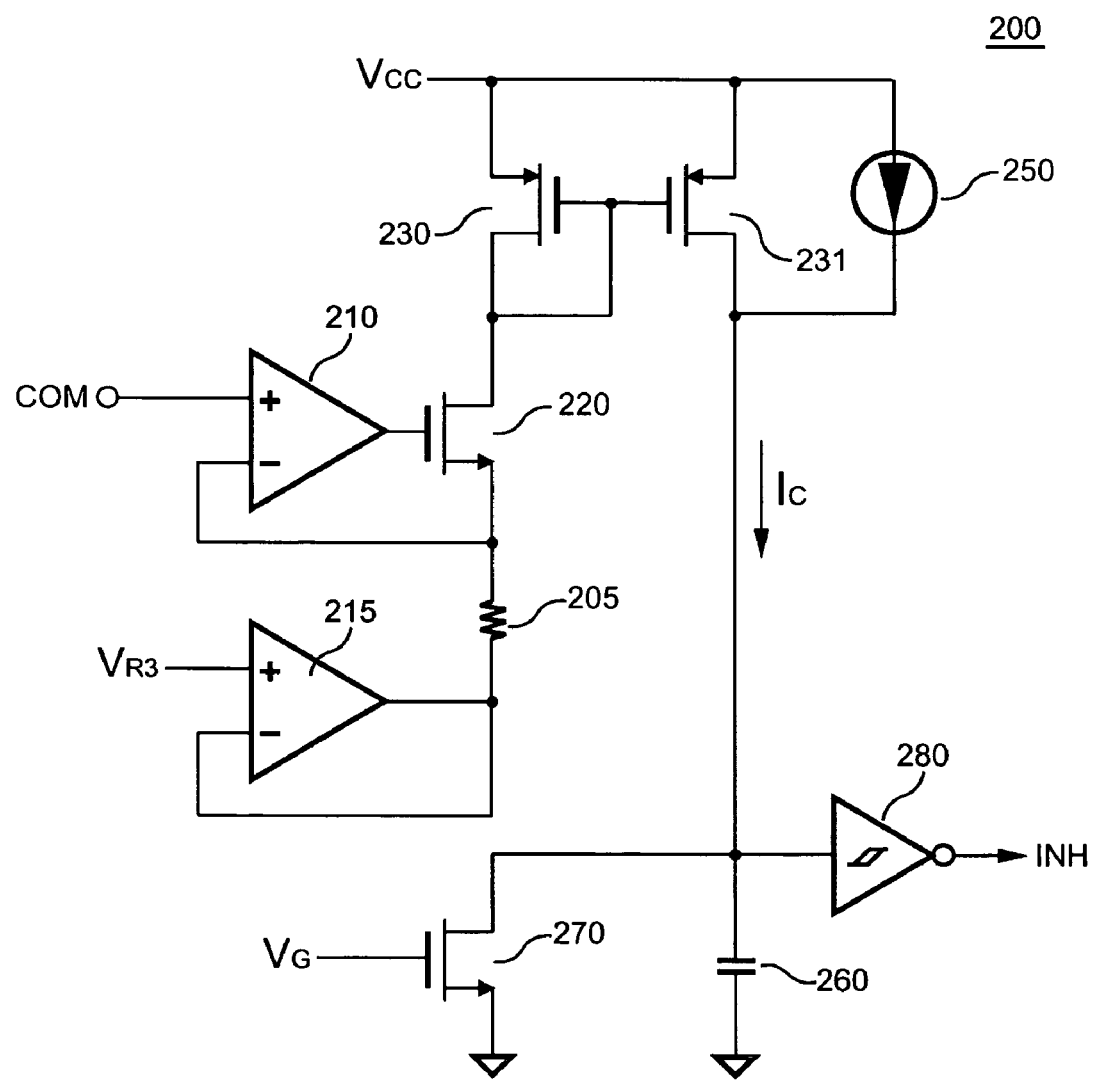
FIG. 9 is a circuit schematic of a delay circuit in accordance with an embodiment of the present invention.

FIG. 9 shows a circuit schematic of the delay circuit 200 in accordance with an embodiment of the present invention, in which the charge current ($I_C$) and the capacitor 260 determine the delay time of the delay circuit 200. An operational amplifier 210 is connected to the COM terminal to receive the error signal. Another operational amplifier 215 is supplied with a threshold voltage ($V_{R3}$). Operational amplifiers 210, 215, a resistor 205, and a plurality of transistors 220, 230, 231 generate a current I231. The current I231 and a current source 250 determine the charge current ($I_C$). The current source 250 provides a minimum charge current. The current I231 is generated proportionally to the error signal, and the delay time is thus increased in response to the decrease of the error signal. The error signal is decreased proportionally to the decrease of the load. The threshold voltage ($V_{R3}$) determines the range of the error signal for light load conditions. A transistor 270 discharges the capacitor 260 when the switching signal ($V_G$) is on. The capacitor 260 shall be charged in response to the turning off of the switching signal ($V_G$). An inverter 280 is connected to the capacitor 260 for generating the inhibit signal (INH).

According to the ZCS and the PFC conversion in discontinuous mode of the present invention, the next switching cycle is started at the boundary of zero inductor current state. The energy is given by $$\epsilon = L \times I^2 / 2 \qquad (10)$$

The power supplied by the PFC converter is expressed as $$Po = [Vp^2 \times T_{ON}^2 / (4 \times L \times T)] \qquad (11)$$

where $T = T_{ON} + T_{OFF}$ is shown in Equations 6 and 7.

When the load of the PFC converter is decreased in the light load condition, the delay time (Td) is increased accordingly and is inserted before the start of the next switching cycle. Therefore, the switching period (T) of the switching signal is extended as $$T = T_{ON} + T_{OFF} + Td \qquad (12)$$

The switching frequency of the switching signal is thus decreased in the light load and no load conditions. The power consumption of the PFC converter is therefore reduced.

Figure 10:
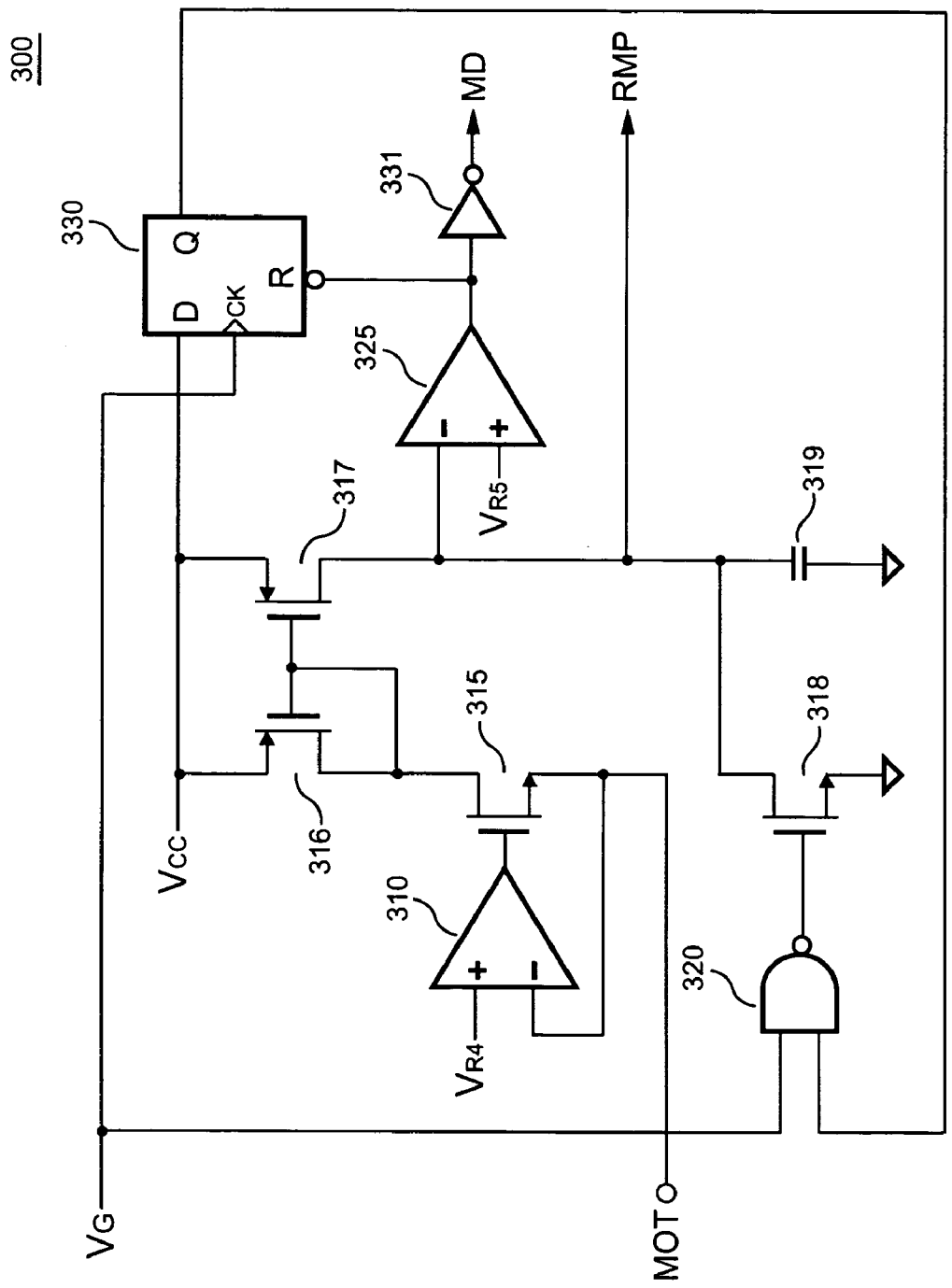
FIG. 10 is a circuit schematic of a ramp generator in accordance with an embodiment of the present invention.

The ramp generator 300 is shown in FIG. 10, in which an operational amplifier 310 includes a reference voltage ($V_{R4}$). The operational amplifier 310, a plurality of transistors 315, 316, 317 associated with the resistor 95 in FIG. 7 to produce a current I317. The current I317 is connected to charge a capacitor 319. The ramp signal (RMP) is generated at the capacitor 319. The current I317 determines the slew rate of the ramp signal (RMP). An NAND gate 320 is connected to a transistor 318 to discharge the capacitor 319 in response to the disabling of the switching signal ($V_G$). Besides, the capacitor 319 shall be discharge once the voltage of the capacitor 319 is higher than the threshold voltage ($V_{R5}$), which limits the maximum on-time of the switching signal ($V_G$). The output of the comparator 325 is connected to reset a flip-flop 330. An inverter 331 is connected to the output of the comparator 325 for generating the maximum-duty signal (MD). The flip—flip 330 is set by the switching signal ($V_G$). The output of the flip-flop 330 is connected to a second input of the NAND gate 320. Therefore, the current I317, the capacitor 319, and the threshold voltage ($V_{R5}$) determine the maximum pulse width of the ramp signal (RMP) and further determine the maximum on-time of the switching signal ($V_G$).

Figure 11:
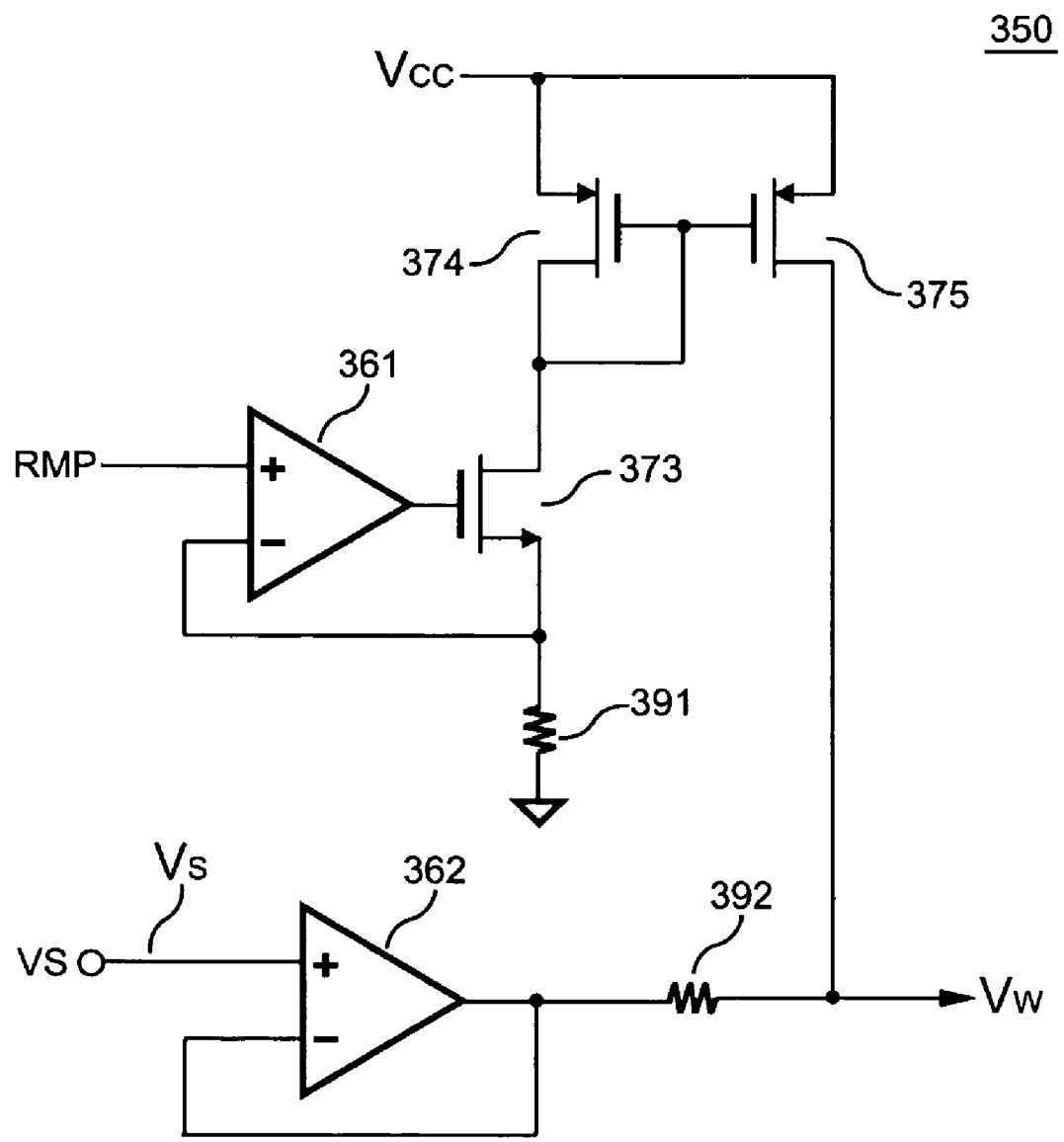
FIG. 11 is a circuit schematic of a mix circuit in accordance with an embodiment of the present invention.

FIG. 11 is a circuit schematic of the mix circuit 350 in accordance with an embodiment of the present invention. An operational amplifier 361, a resistor 391 and a plurality of transistors 373, 374, 375 form a voltage-to-current converter. The ramp signal (RMP) is connected to the voltage-to-current converter to convert the ramp signal (RMP) to a current I375. The switching current signal is connected to a buffer amplifier 362. The current I375 is connected to the buffer amplifier 362 through a resistor 392. The mixing signal ($V_W$) is thus generated at the resistor 392 proportionally to the ramp signal (RMP) and the switching current signal. The slew rate of the switching current signal is increased in response to the increase of the input voltage of the PFC converter. Accordingly, the slew rate of the mix signal is increased in response to the increase of the input voltage ($V_{IN}$). The on-time of the switching signal ($V_G$) is thus increased inversely proportionally to the input voltage ($V_{IN}$). The input current harmonic is reduced by the modulated on-time of the switching signal ($V_G$).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switching control circuit for a PFC converter wherein generating a switching signal coupled for switching an inductor for power factor control, comprising:
    a detection terminal, coupled to the inductor for generating a detection signal in response to the discharge of the inductor;
    an input terminal, coupled for detecting a switching current signal in accordance with the switching current of the inductor;
    a ramp generator, producing a ramp signal in response to the switching signal;
    a program terminal, coupled to the ramp generator for determining the slew rate of the ramp signal and determining the maximum on-time of the switching signal;
    an error amplifier, coupled to the output of the PFC converter for generating an error signal for regulating the output of the PFC converter;
    a mix circuit, generating a mixing signal proportional to the ramp signal and the switching current signal;
    wherein the switching signal is turned on in response to the detection signal; and the switching signal is turned off once the mixing signal is found to be higher than the error signal.

2. The switching control circuit as claimed in claim 1 further comprising a delay circuit generating an inhibit signal in response to the turning off of the switching signal, wherein the inhibit signal includes a delay time for postponing the turning on of the switching signal and for limiting the maximum switching frequency of the switching signal.

3. The switching control circuit as claimed in claim 2, wherein the delay time is increased in response to the decrease of the error signal, and the error signal is decreased proportionally to the decrease of the load.

4. The switching control circuit as claimed in claim 1, wherein the slew rate of the switching current signal is increased in response to the increase of the input voltage of the PFC converter.

5. A PFC converter having a switching control circuit for generating a switching signal coupled to switch an inductor for power factor control, in which the switching control circuit comprising:
    a detection terminal coupled to the inductor to generate a detection signal in response to the discharge of the inductor;
    a ramp generator producing a ramp signal in response to the switching signal;
    a program terminal coupled to the ramp generator to determine the slew rate of the ramp signal and determine the maximum on-time of the switching signal;
    an error amplifier coupled to the output of the PFC converter to generate an error signal for regulating the output of the PFC converter;
    wherein the switching signal is switched on in response to the detection signal; and the switching signal is switched off in response to comparison of the ramp signal and the error signal.

6. The switching control circuit as claimed in claim 5 further comprising a delay circuit generating a inhibit signal in response to the off of the switching signal; in which the inhibit signal includes a delay time to postpone the turn-on of the switching signal and limit the maximum switching frequency of the switching signal.

7. The switching control circuit as claimed in claim 6, in which the delay time is increase in response to the decrease of the load.

8. The switching control circuit as claimed in claim 5, wherein the slew rate of the switching current signal is increased in response to the increase of the input voltage of the PFC converter.

9. A switching control circuit for a PFC converter wherein generating a switching signal coupled for switching an inductor for power factor control, comprising:
    a detection terminal, coupled to the inductor for generating a detection signal in response to the discharge of the inductor;
    an input terminal, coupled for detecting a switching current signal in accordance with the switching current of the inductor;
    a ramp generator, producing a ramp signal in response to the switching signal;
    an error amplifier, coupled to the output of the PFC converter for generating an error signal for regulating the output of the PFC converter;
    a mix circuit, generating a mixing signal proportional to the ramp signal and the switching current signal;
    wherein the switching signal is turned on in response to the detection signal; and the switching signal is turned off in response to the comparison of the mixing signal and the error signal.

10. The switching control circuit as claimed in claim 9 further comprising a delay circuit generating an inhibit signal in response to the turning off of the switching signal, wherein the inhibit signal includes a delay time for postponing the turning on of the switching signal and limiting the maximum switching frequency of the switching signal.

11. The switching control circuit as claimed in claim 10, wherein the delay time is increased in response to the decrease of the load.

12. The switching control circuit as claimed in claim 9, wherein the slew rate of the switching current signal is increased in response to the increase of the input voltage of the PFC converter.

* * * * *